Aug. 19, 1947.  W. W. HANSEN  2,425,738
TUNABLE HIGH FREQUENCY ELECTRON TUBE STRUCTURE
Filed Oct. 23, 1941  7 Sheets-Sheet 1

*INVENTOR*
WILLIAM W. HANSEN
BY
*Herbert D. Thompson*
Their ATTORNEY.

Aug. 19, 1947.    W. W. HANSEN    2,425,738
TUNABLE HIGH FREQUENCY ELECTRON TUBE STRUCTURE
Filed Oct. 23, 1941    7 Sheets-Sheet 2

INVENTOR
WILLIAM W. HANSEN
BY
Their ATTORNEY

INVENTOR
WILLIAM W. HANSEN
BY
Their ATTORNEY

Aug. 19, 1947.  W. W. HANSEN  2,425,738
TUNABLE HIGH FREQUENCY ELECTRON TUBE STRUCTURE
Filed Oct. 23, 1941  7 Sheets-Sheet 5

INVENTOR
WILLIAM W. HANSEN
BY
Herbert H. Thompson
Their ATTORNEY

Aug. 19, 1947.  W. W. HANSEN  2,425,738
TUNABLE HIGH FREQUENCY ELECTRON TUBE STRUCTURE
Filed Oct. 23, 1941  7 Sheets-Sheet 6

INVENTOR
WILLIAM W. HANSEN
BY
Herbert ?. Thompson
Their ATTORNEY

INVENTOR
WILLIAM W. HANSEN
BY
Herbert A. Thompson
Their ATTORNEY

Patented Aug. 19, 1947

2,425,738

UNITED STATES PATENT OFFICE 2,425,738

TUNABLE HIGH-FREQUENCY ELECTRON TUBE STRUCTURE

William W. Hansen, Garden City, N. Y., assignor to Sperry Gyroscope Company, Inc., Brooklyn, N. Y., a corporation of New York Application October 23, 1941, Serial No. 416,170

8 Claims. (Cl. 315—6)

The present invention relates to the art including ultra-high frequency electron discharge tubes, and is more particularly concerned with such tubes wherein cavity resonators are used to vary the velocity of an electron beam and the electrons are thereafter bunched.

In prior application Serial No. 201,898, filed April 14, 1938, in the names of R. H. Varian and W. W. Hansen, for Radio transmission and reception, now Patent No. 2,280,824, granted April 28, 1942, there is disclosed a tube of the above type used as a frequency multiplier, in which the bunched electron beam excites a resonator tuned to a harmonic of the energizing frequency.

It is an object of the present invention to provide an improved form of frequency multiplier tube of the above type, wherein fewer cavity resonators are used and greater and more efficient outputs may be obtained.

It is another object of the present invention to provide improved forms of gang tuning devices for simultaneously tuning a plurality of cavity resonators which need not be of similar size or shape.

It is a further object of the present invention to provide improved forms of cavity resonators suitable for use in tubes of the above type, and which are more compact and efficient in operation.

Other objects and advantages will become apparent from the specification, taken in connection with the accompanying drawings wherein the invention is embodied in concrete form.

Figures 1, 1A, 2, 3:
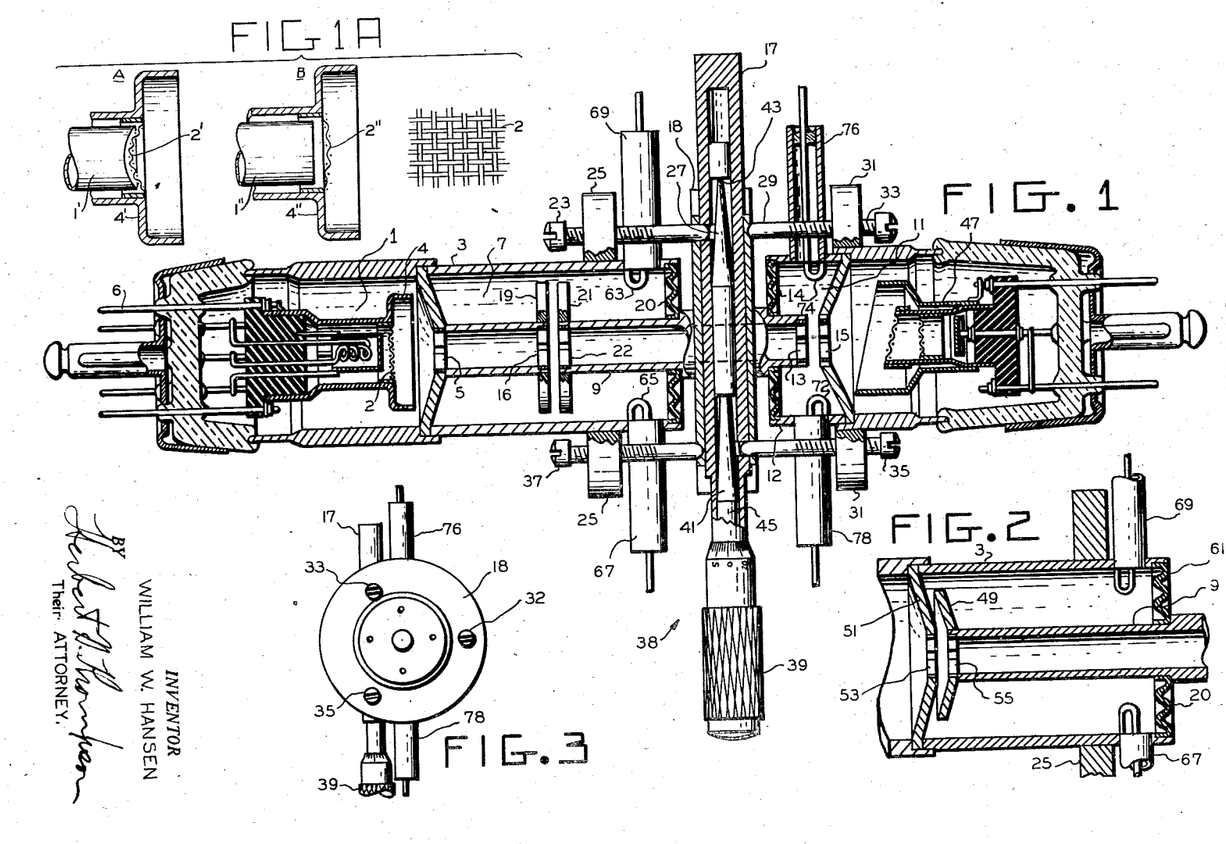
Fig. 1 shows a longitudinal cross-section of a frequency multiplier tube having an improved cavity resonator and a gang tuning control.
Fig. 1A shows several forms of modulating grid structure useful with the device of Fig. 1.
Fig. 2 shows a longitudinal cross-section of a modified form of cavity resonator, suitable for use with the tube of Fig. 1, or with other tubes.
Fig. 3 shows an end view of the tube of Fig. 1.

Referring to Figs. 1 and 3 reference numeral 1 indicates a cathode structure for producing a supply of electrons. This structure may be of any suitable type, such as that shown and described in U. S. Patent 2,250,511, issued July 29, 1941, in the name of Russell H. Varian et al., or that shown in Figs. 6-8 of the present application.

Cathode 1 is normally maintained at a high negative potential with respect to metallic housing 3 which is grounded. In this manner the electrons emitted by cathode 1 are formed into a beam which is projected axially of the evacuated tube through an entrance grid 5 of a cavity resonator 7 which acts to provide a variable electron velocity along the beam. The variable velocity electrons proceed down a drift tube 9 and become bunched. Thereupon they act to excite a resonator 11 to oscillation by passage through the exciting grids 13 and 15 thereof. The beam passing through the second grid 15 of resonator 11 is projected on any suitable type of electron beam utilization or collecting means, illustrated in this case as being a detector 41 of the type shown in U. S. Patent No. 2,311,658, granted February 23, 1943, to W. W. Hansen, S. F. Varian and R. H. Varian. The structure of resonator 11 is shown and claimed in their United States Patent No. 2,410,063, granted October 29, 1946.

Cavity resonator 7 is designed to have a relatively low natural frequency and at the same time is of relatively small size. This is provided by using a pair of spaced centrally located flanges 19, 21, connected to exciting grids 16, 22. One flange 19 is fixed to the entrance grid 5 and housing 3. The other flange 21 is fastened to housing 3 by a portion of drift tube 9 and a flexible wall 20. This flexible wall 20 permits cavity resonator 7 to be tuned by changing the spacing between flanges 19 and 21 thereby changing the capacitance of the circuit.

The present tube is designed to be a frequency multiplier tube of the general type shown and described in prior Patent No. 2,280,824. In that prior patent a similar type of tube was shown using buncher and catcher resonators tuned to the fundamental frequency and an auxiliary resonator tuned to the desired harmonic frequency, through which the beam passed after traversing the catcher. The present invention eliminates the catcher resonator of the prior application and utilizes the harmonically tuned resonator for that purpose.

Thus, in the tube of Fig. 1, buncher resonator 7 is tuned to the fundamental operating frequency, while catcher resonator 11 is tuned to the desired harmonic output frequency.

It should be noted that the efficiency of these frequency transformers depends upon the maximum value of the Bessel's function of order equal to the harmonic used. Thus, if $n$ is the harmonic involved, the theoretical efficiency of frequency conversion is given by the following table:

| $n$ | Per cent efficiency |
| --- | --- |
| 1 | 58 |
| 2 | 48 |
| 5 | 37 |
| 10 | 30 |
| 20 | 24 |

Therefore resonator 11 may be tuned to the 20th harmonic of resonator 7 and still obtain nearly half as much energy converted to 20th harmonic output as would be obtained with a conventional 1:1 resonant cavity oscillator.

In operation, cavity resonator 7 may be energized from any suitable source of ultra-high frequency by way of coupling loop 63 or 65 and transmission line connector 69 or 67. Then harmonic frequency energy may be abstracted from resonator 11 by coupling loop 72 or 74, and connector 76 or 78.

Copending application Serial No. 390,044 for High frequency tube structures, filed April 24, 1941, in the name of S. F. Varian and R. H. Varian (now Patent No. 2,345,642, granted April 4, 1944), shows several types of gang tuning control for simultaneously tuning several cavity resonators. In the above application, however, the problem was somewhat simplified by the fact that all the resonators were tuned to the same frequency, and hence had approximately the same control displacements.

In the present application, it is desired to simultaneously tune several resonators which are not tuned to the same frequency and which therefore have differing control displacements. Fig. 1 shows one type of suitable gang tuning, which is the invention of John R. Woodyard.

As has been described, the tube of Fig. 1 is formed in three sections, resiliently fastened together. Thus, the center section, comprising plate 18, drift tube 9 and resonator grids 22 and 13, resiliently supports through wall 20, the left section comprising cathode 1, housing 3 and grid 16 of resonator 7, and also resiliently supports, through flexible wall 14, the right section comprising detector 47, the housing 12 and grid 15 of resonator 11.

Plate 18 forms the support for the entire tube, and is fixed. Flanges 25 and 31 are suitably fastened to housings 3 and 12, and threadedly hold tuning screws such as 37, 23, 33 and 35. These tuning screws butt either plate 18, or plunger 45 carried thereby, so that turning of these screws causes relative displacement between plate 18 and flanges 25, 31, thereby changing the size and shape of resonant cavities 7, 11, and so effecting a coarse tuning thereof. These screws 23, 33, 35, 37 thus provide the individual initial adjustments for resonators 7 and 11.

Gang tuning for resonators 7 and 11 is provided by a micrometer screw arrangement 38. Turning the knob 39 causes longitudinal movement of plunger 45 in a cylinder 17 carried by plate 18. Plunger 45 is formed with two separate tapered sections 41 and 27. Screws 23 and 35 butt against these tapered portions 27 and 41, respectively.

Hence, longitudinal movement of plunger 45 will cause displacements of screws 23 and 35, the amount of displacement being determined by the tapers of sections 27 and 41, respectively. Hence, by properly proportioning these tapers, it is possible to adjust both resonators 7 and 11 simultaneously by different amounts to maintain their tuned harmonic relation.

It will be clear that the gang tuning device shown is not restricted to use with frequency multiplier devices, but may, by suitable design of the tapered sections 27 and 41, equally well be used in place of the gang tuning devices shown in Patent No. 2,345,642. Here all that is necessary is to have substantially equal tapers, since screws 35 and 23 are located at approximately equal radial distances from the axis of the tube. These screws need not be located at equal radial distances from the axis of the tube, if desired, and the respective required tuning movements in that case are obtained by suitably proportioning the respective tapers 27 and 41. Thus, in Fig. 3, for example, if screw 35 is moved radially outwardly, the taper of 41 must be increased to compensate for such changed position.

A flat modulating grid 2 is shown carried by the focussing electrode 4 in Fig. 1. Suitable modulating potentials supplied as through lead 6 to grid 2 will effect modulation of the electron beam. Distortion of the grid 2 due to temperature changes may be greatly reduced by using a bowed grid as shown at 2' and 2" in Fig. 1A. The concavity of the cathode 1' in A of Fig. 1A also produces some focussing of the electron beam.

Any type of cavity resonator may be used in place of resonators 7 or 11. Fig. 2 shows a suitable type, illustrated as a modification of resonator 7, and also described and claimed in Hensen and Woodyard application Serial No. 420,771, filed November 28, 1941. Here the capacitative flanges 51, 49 are placed at the entrance end of the resonator, exciting grids 53, 55 being located centrally of flanges 51, 49. The dished shape of flanges 51 and 49 assists in reducing change in grid spacing due to temperature changes. Flange 49 is disposed parallel to flange 51 to get maximum capacitative effect. The usual coupling lines 67 and 69 are provided.

Figures 4, 5, 6, 7, 8:
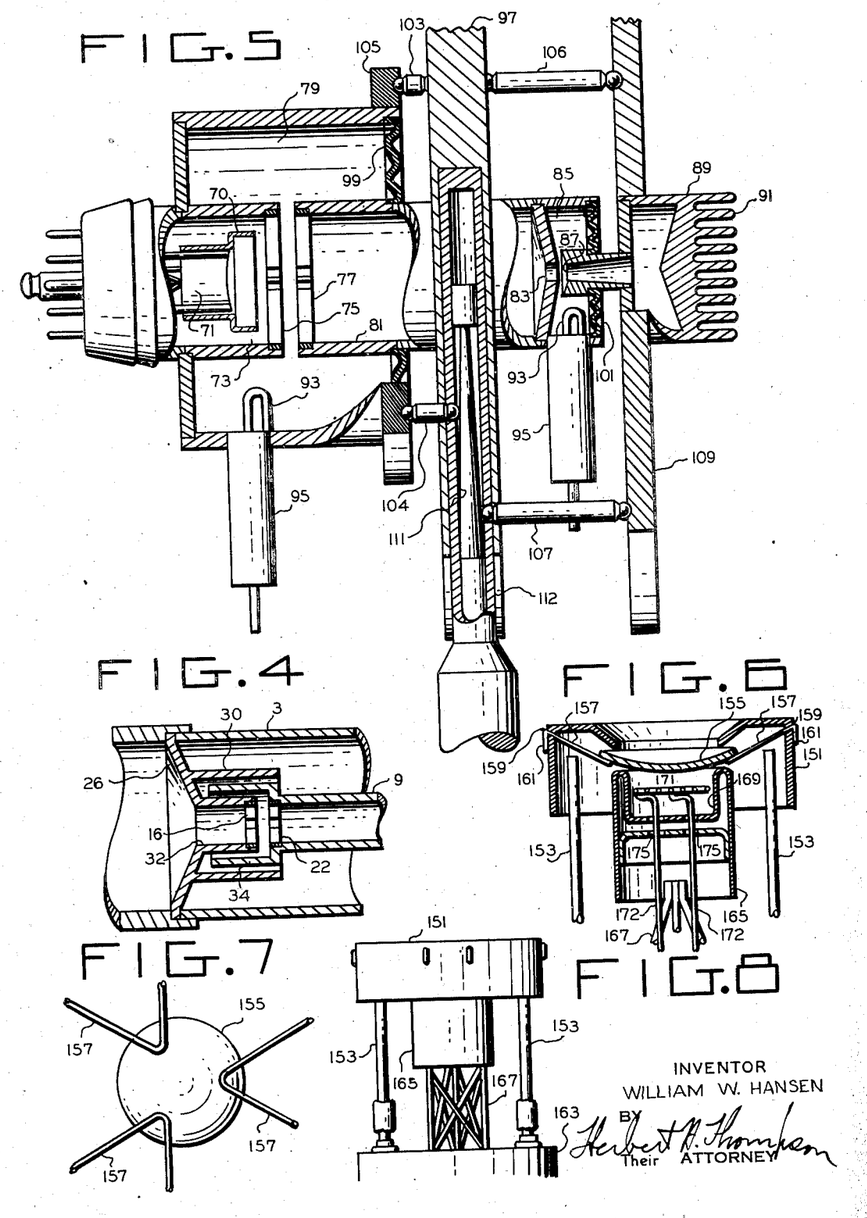
Fig. 4 shows a longitudinal section of a portion of another modification of the cavity resonator shown in Figs. 1 and 2.
Fig. 5 shows a longitudinal section of a modified form of the tube of Fig. 1.
Fig. 6 shows a longitudinal section of an improved cathode structure for tubes such as those of Figs. 1 and 5.
Fig. 7 shows a plan view of the cathode emitter support of Fig. 6.
Fig. 8 shows an elevation view of the complete cathode of Fig. 6.

Fig. 4 shows a further modification of resonator 7. Capacitance is obtained between coaxial cylinders 30, 32 fastened to flange 26 and coaxial cylinder 34 fastened to drift tube 9. Grids 16 and 22 are carried by flange 32 and the drift tube, respectively. In this way a fairly large capacitance may be obtained, because of the large capacitance surfaces of cylinders 30, 32, 34, thus permitting decreased size for the resonator. In addition, slight dimensional changes due to vibration or heat expansion have less effect on tuning than in other types, permitting more stable operation of the device as a whole.

It is clear that any number of nested cylinders may be used, and that it is immaterial which grid carries the inner or outer cylinders.

The cavity resonators shown in Figs. 1, 2 and 4 may be used in types of tubes other than that shown in Fig. 1, or wherever such resonators are desirable.

Fig. 5 shows a somewhat modified form of frequency multiplier, suitable for high power frequency conversion. Here the electrons emitted by cathode 71 are focussed into a beam by a focussing electrode 73 having a suitable potential applied thereto. Cathode 71 is formed with a relatively large emitting surface, allowing for a higher electron beam current. This current passes through the exciting grids 75, 77 of a "buncher" cavity resonator 79 tuned to the fundamental operating frequency into the drift space formed by drift tube 81. The grid openings of grids 75, 77 are made large in diameter to accommodate the wide electron beam emitted from the large emitting surface of cathode 71.

Focussing electrode 73 serves to focus the electron beam upon the entrance 83 of the "catcher" cavity resonator 85 after passage through drift tube 81. Due to this focussing action, opening 83 may be made relatively small, and though a grid is preferable, the same may be omitted in this opening and still obtain moderately efficient interchange of energy between the electron beam and cavity resonator 85, which, as in Fig. 1, is tuned to the desired harmonic.

The electron beam, after passing through the second opening 87 of resonator 85, is allowed to dissipate its remaining energy by conversion to heat upon impinging collector member 89, which may be provided with heat dissipating fins 91 for more efficient heat dispersal. It is clear that any type of electron beam utilizing or dissipating means could be used here.

Coupling loops 93 and concentric transmission line connecting members or terminal posts 95 may be provided for coupling external circuit elements to resonators 79 or 85, as desired.

Fig. 5 also shows another type of gang tuning means for frequency multipliers, which is the invention of Russell H. Varian. Tuning of each of the resonators 79 and 85 is effected by varying the cavity size and shape, as is well known. For this purpose, a supporting member 97 is provided, which rigidly supports drift tube 81, grid 77 of resonator 79, and member 83 of resonator 85. The remainder of resonator 79, and cathode 71, are supported from member 97 through a resilient wall member 99. Similarly, a resilient wall member 101 serves to support the remainder of resonator 85 and electron-collector 89.

Thrust rods 103, 104 opposed by the resilience of member 99, serve to separate supporting member 97 and a flange 105 fastened to the resiliently supported portion of resonator 79. Similar thrust rods 106, 107 serve to separate supporting member 97 and a plate 109 rigidly fastened to collector 89.

Thrust rods 104 and 107 are not directly engaged by supporting member 97, but rest upon a tapered rod 111, which may be moved transversely of the beam axis within a cylinder 112, which is secured to member 97, by a suitable micrometer screw arrangement, such as shown in Fig. 1.

Rod 111 has a uniform taper, so that a given axial motion will result in equal longitudinal motions of thrust rods 104 and 107. However, it will be seen that the shape changing effect of rod 104 upon resonator 79 will be much greater than that of rod 107 upon resonator 85, because of the relatively smaller effective lever arm of rod 104 in its tuning action, bearing in mind that thrust plate 109 turns about the line joining the end of strut 106 and the remaining corresponding strut (not shown) while flange 105 turns about the line joining the ends of strut 103 and the remaining corresponding strut (not shown). This will be understood by referring to Fig. 3, wherein adjustment of the micrometer 39 effects movement of screw 35 and the turning of flange 31 about the pivotal line joining the ends of screws 32 and 33. Moving the pivotal line inwardly has the same effect as moving the screw 35 outwardly.

In this way, by proper selection of proportions and dimensions, resonators 79 and 85 may be simultaneously tuned over a substantial frequency range, while maintaining their harmonic relationship.

Figures 5A, 5B, 5C:
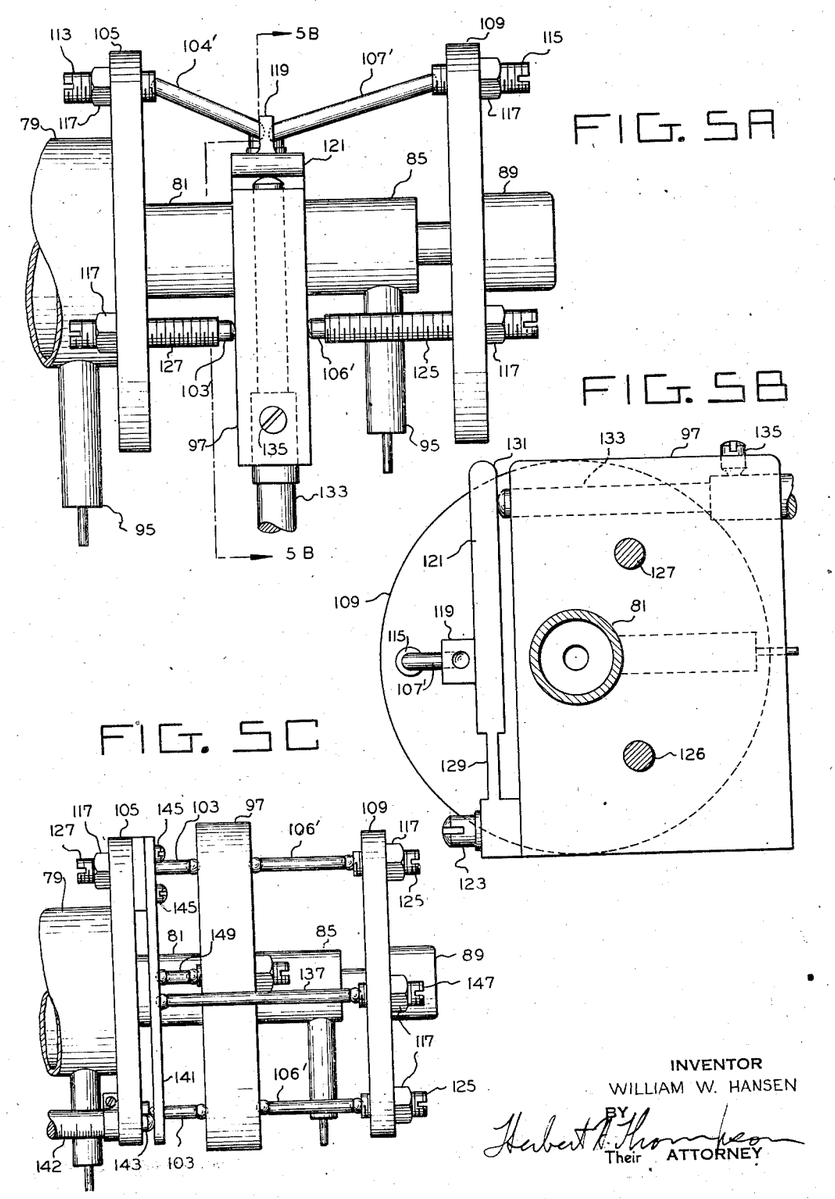
Fig. 5A shows a longitudinal section of a modified form of gang tuning control, suitable for use with the tubes of Figs. 1 and 5.
Fig. 5B shows a cross-section of Fig. 5A taken along line 5B—5B thereof and rotated 90°.
Fig. 5C shows a longitudinal section of another modified form of gang tuning control.

Figs. 5A and 5B show a modified form of tuning control, illustrated as being applied to the tube of Fig. 5, although capable of wider utility. Here thrust rods 104', 107', corresponding to rods 104 and 107 of Fig. 5, are socketed at one end in the ends of screws 113, 115, respectively threaded in flange 105 and plate 109. Lock nuts 117 may be provided for these screws 113, 115. The other ends of rods 104', 107' are socketed in opposite sides of a projection 119 formed on a resilient cantilever member 121 which is rigidly fastened at one end to supporting member 97, as by screw 123 or any other suitable means.

Other thrust rods 103' and 106', corresponding to rods 103 and 106 of Fig. 5, are also provided. These rods are formed with threaded portions 125, 127 which are screwed respectively into plates 109 and 105. Lock nuts 117 are also provided here. Alternatively, rods 103', 106' may be made separate from screws 125, 127 and socketed therein as shown with respect to rods 104' and 107', and as also shown in Fig. 5C.

Cantilever member 121 may be provided with a reduced bending section 129, at which resilient flexure takes place. The movable end 131 of member 121 is adapted to be moved by an actuating rod 133, which may be driven by a micrometer screw arrangement held by supporting member 97, similar to that shown in Fig. 1. A set screw 135 is used to maintain the tuning setting when once adjusted.

In operation, screws 113, 115, 125, 127 are individually adjusted to give proper tuning for a desired frequency, whereupon lock nuts 117 are tightened to maintain that tuning. To adjust the tube to any other operating frequency, rod 133 is actuated, thereby deflecting cantilever member 121 and thrusting on rods 104', 107' to produce gang tuning of the resonators. Due to the unequal lever arms of these two rods, this will produce differing dimensional changes in resonators 79 and 85. By proper dimensioning of parts, the changes in tuning of resonators 79 and 85 may be made proportional, whereby the harmonic relation of their resonant frequencies may be maintained over a substantial range of operating frequencies.

Fig. 5C shows another modification of tuning control, suitable for the tube of Fig. 5 or for other tubes as well. The arrangement is somewhat similar to that of Figs. 5A and 5B. In Fig. 5C the cantilever member 141 (corresponding to member 121 of Figs. 5A and 5B) is supported from flange 105. Upon actuation of a micrometer screw 142, actuating rod 143 serves to bend cantilever member 141 about its point of support, at screws 145, on flange 105. Supporting member 97 is stationary, serving to support the entire tube, so that thrust rod 149, positioned between supporting member 97 and cantilever member 141, serves as a fulcrum for the forces applied by actuating rod 143. The lever arm for resonator 79 will be the distance from rod 149 to screws 145. The lever arm for resonator 85 will be the distance from rod 149 to rod 137, which is positioned between cantilever member 141 and plate 109. Since the latter lever arm is smaller than the former, less change in dimensions will occur in resonator 85 than in resonator 79, and again, by proper proportioning, gang tuning of these two resonators is thus obtained while maintaining their harmonic relationship.

Initial tuning means in the form of screws 125, 127, 147 are also provided as in the case of Figs. 1, 5A and 5B.

It is clear that the tuning means shown in Figs. 1, 5, 5A and 5C are not restricted to the particular tubes used, but are generally useful with any device wherein gang tuning of cavity resonators is desired.

Figure 9:
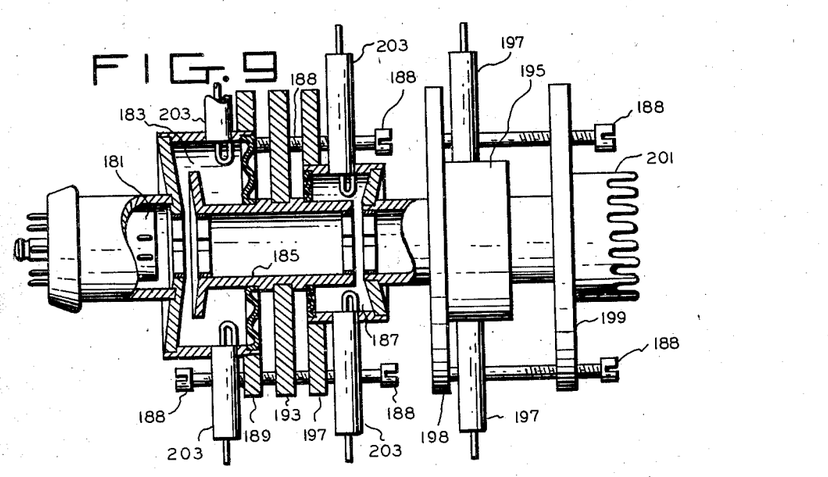
Fig. 9 shows a further modification of the tubes of Figs. 1 and 5, including a buffer amplifier section.
Figures 16, 17, 18:
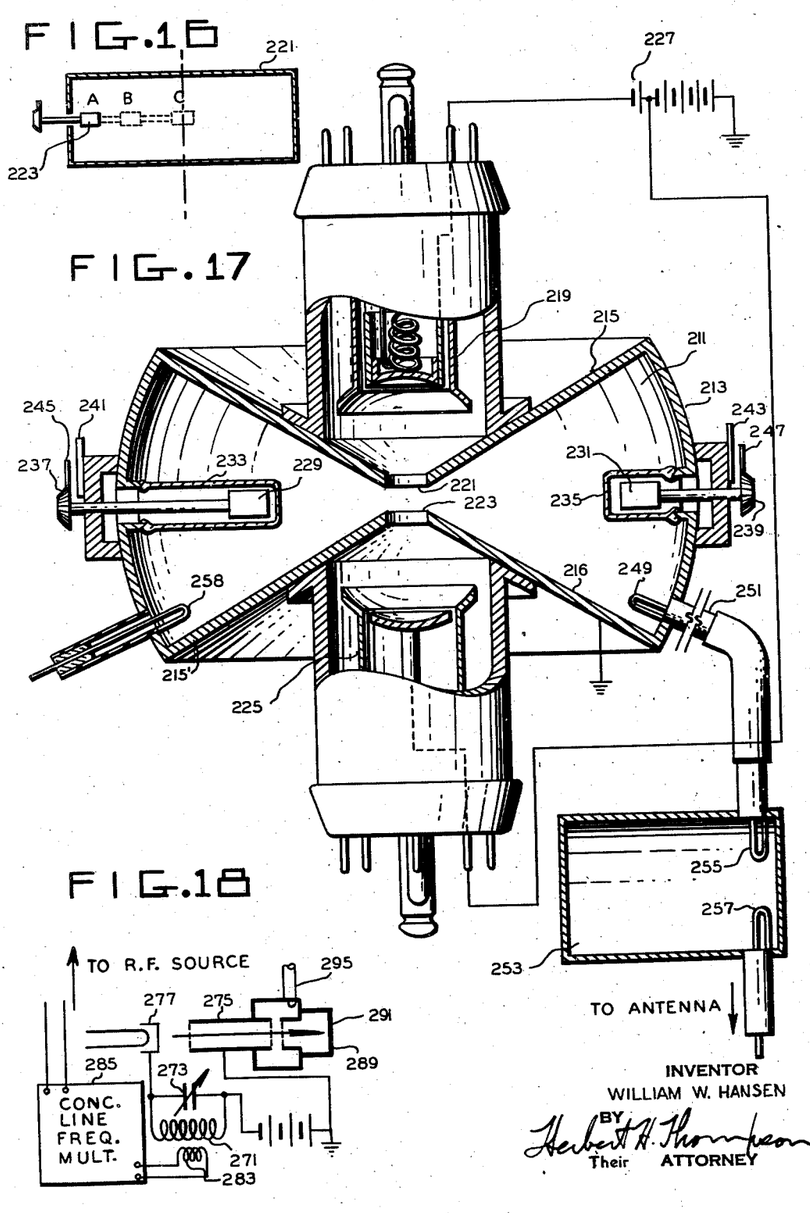
Fig. 17 shows a longitudinal cross-section partly in elevation of a reflex-type frequency multiplier and its output circuit.
Fig. 18 shows a schematic representation of a frequency multiplier circuit suitable for large multiplication ratios.
Figures 19, 20:
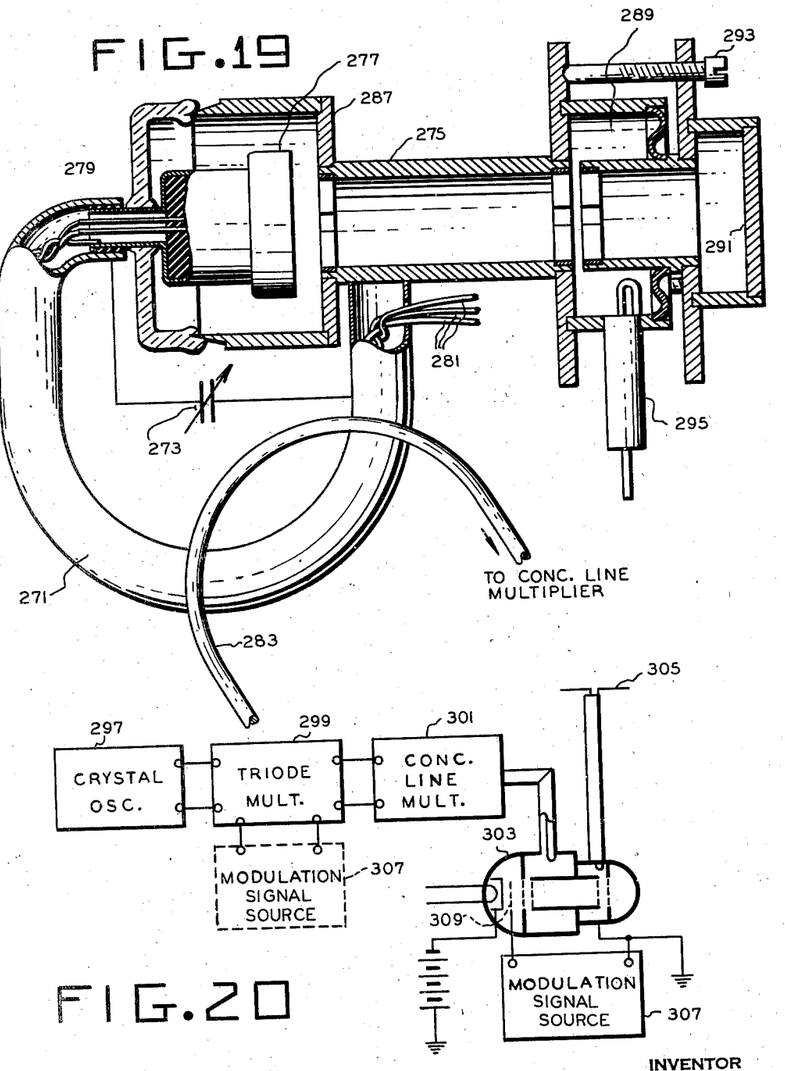
Fig. 19 shows a structural embodiment, partly in section, of the device of Fig. 18.
Fig. 20 shows a schematic representation of a radio transmitter including a frequency multiplier.

Figs. 6-8 show an improved cathode suitable for use with the tube of Figs. 1, 9 or 19, or, with some slight modification, with the focussed beam tubes of Figs. 5 and 17. In this construction, which is the invention of Sigurd F. Varian, a focussing shield 151 is supported on rods 153 suitably fastened thereto, as by welding. A dish-shaped emissive element 155 as of tantalum has several small stiff wires 157 fastened thereto, also by welding. These wires 157 pass through openings 159 of shield 151, and are crimped over as shown at 161, thereby serving to support the emitter 155 from shield 151. Wires 157, being of small diameter, form a relatively heat-insulating support for the emitter 155. Supporting rods 153 may be imbedded in a block of insulating material 163 supported by the stem of the tube in any suitable manner.

Supported coaxially of the focussing shield 151 and back of the emitter 155 is a heater shield 165 shown as supported by a truss-work of rods 167 also imbedded in block 163. Shield 165 is formed with a cylindrical recessed portion 169, in which is positioned a flat spiral heater filament 171 which may be of tungsten. The energizing leads 172 for heater 171 are led through openings 175 in the recessed portion 169 of heater shield 165 to insulating block 163, and therethrough to the external terminals of the tube, which are not shown. Heater 171 may be supported by its lead in wires 172, or by suitable insulating bushings in shield portion 169.

In operation, the heater 171 is energized from a suitable source of electric current and is thereby heated to a temperature suitable for the emission of electrons. A high potential negative with respect to emitter 155, is placed on heater 171, so that the electrons emitted by the heater 171 will bombard the emitter 155, raising the emitter temperature to one suitable for copious emission of electrons for use in the tube. By this structure it is possible to obtain a high electron beam current, together with good focussing of the beam. The emitter 155 having a smooth surface gives uniform emission that is easily focussed. This emitter may be flat or concave as shown, the concavity enhancing the focussing.

Fig. 9 shows a frequency multiplier tube similar in construction to Fig. 1, using the buncher resonator of Fig. 2. This tube, which is my invention jointly with John R. Woodyard, and is claimed in copending application Serial No. 600,440, filed June 20, 1945, comprises a cathode 181, a buncher resonator 183, tuned to fundamental frequency, drift tube 185 and catcher resonator 187, tuned to harmonic frequency. Tuning is provided by simple thrust screws 188 threaded in flanges 189 and 191 and thrusting against plate 193, fixed to drift tube 185. This construction is similar to that used in Figs. 1, 5, 5A, 5B and 5C. Any of the gang tuning means previously described might be used here also.

Instead of using the electron beam, after passage through catcher 187, in a detector, as in Fig. 1, or dissipating it as in Fig. 5, the beam is passed through a further resonator 195 also tuned to harmonic frequency, which acts as a second catcher for extracting additional energy from the beam which energy may be supplied through transmission line coupling elements 197.

Resonator 195 is constructed in two parts connected by a resilient wall and may be of any of the types shown more in detail in Figs. 1, 2, 4, 5, 5A, 5B or 9. One part is fastened to a plate 199 and the other to a flange 198, whereby the resonator may be tuned by thrust screws 188 threaded into plate 189 and butting flange 198.

The electron beam, after passing through resonator 195, is dissipated into heat by collector member 201 carried by plate 199, similar to that shown in Fig. 5.

Concentric line coupling members or terminal posts 203 are also provided for resonators 183 and 187.

Figs. 10-16 are explanatory diagrams for the reflex re-entrant type frequency multiplier of Fig. 17. The main feature of this multiplier is the single resonator 211 which is formed of a substantially spherical portion 213 having re-entrant conical portions 215, 215' formed therewith.

Figure 10:
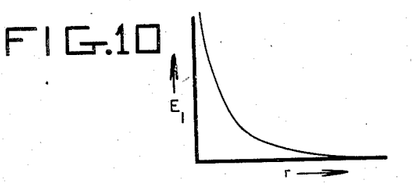
Figs. 10-16 are explanatory diagrams of the device of Fig. 17.
Figure 11:
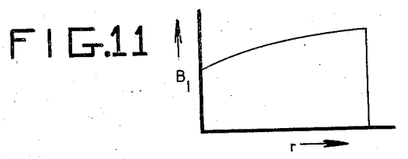
Figure 12:
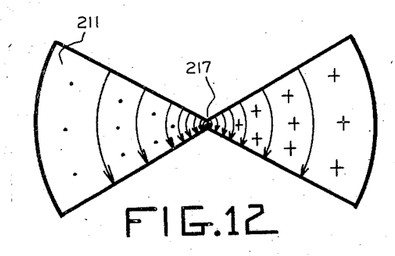

Referring to Figs. 10-12, it has been found that a resonator of this type has a magnetic field B whose component of fundamental frequency is given by $$B_1 = \frac{\sin kr}{kr}$$

where $$k = \frac{2\pi}{\lambda}$$

$\lambda$ being the wave length and $r$ being the radial distance from the center 217 of spherical section 213. The fundamental component of the electric field E is given by $$E_1 = \frac{\cos kr}{kr}$$

In Fig. 12, an instantaneous picture of the condition of resonator 211 is given, wherein the electric field $E_1$ is denoted by arrows, and the magnetic field $B_1$ by dots and plus signs, the dots denoting vertically upward (out of the paper) pointing magnetic field vectors, and the plus signs denoting downward vectors. The density of arrows, dots or plus signs denotes relative intensity of the field components. For the given central cross-section of Fig. 12, the magnetic field lines are circles cutting the plane of the section perpendicularly, and the electric field lines are arcs of circles in the plane of the section. These fields are plotted against radial distance $r$, in Figs. 10 and 11.

Figure 13:
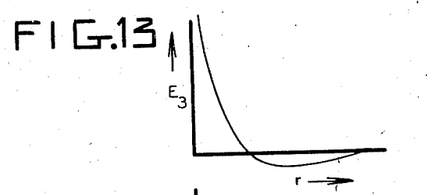
Figure 14:
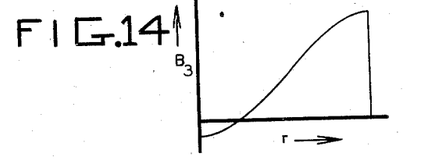
Figure 15:
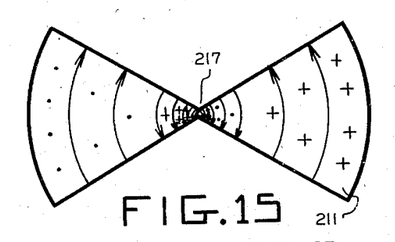

Similarly, a third harmonic oscillation may be set up in the same resonator, whose electric and magnetic components are given by $$E_3 = \frac{\cos 3kr}{3kr}, \quad B_3 = \frac{\sin 3kr}{3kr}$$

which are indicated in Figs. 13–15. The principle of the device of Fig. 17 resides in setting up both of these oscillations simultaneously.

To explain the operation of this device, let it be assumed that the resonator 211 is oscillating weakly both at frequency $f$ and $3f$, the latter being generally much weaker than the former since it is a harmonic of the actual resonant frequency. If an electron beam is passed through the resonator, it will become velocity modulated relatively strongly by $f$ and weakly by $3f$. The beam may then be reversed in direction, and passed through the resonator again. With the bunching distance properly adjusted, both the $f$ and $3f$ fields in the resonator will extract energy from the electron beam and the oscillations will build up. Since the $3f$ field is always weaker than the $f$ field, most of the energy for maintaining the $3f$ field comes from the harmonic in the bunching caused by the $f$ field.

In this manner the resonator is caused to oscillate at both fundamental and harmonic frequencies. The problems remaining are to tune the two fields individually and to abstract the harmonic energy for use. Consider now Fig. 16, wherein is shown a single cylindrical resonator 221. If a tuning paddle 223 is placed at A, the inductance of the resonator is reduced, increasing the resonant wave length. Placing the paddle 223 at C increases the capacitance and decreases the resonant wave length. For some intermediate position B, obtainable empirically, the paddle will not tune this mode of oscillation. In a similar manner, a position can be found where another paddle will not tune the harmonic oscillation. It can be shown that each paddle will tune one mode of oscillation and not the other.

This theory is applied to the frequency multiplier of Fig. 17. Referring to this figure, the frequency multiplier comprises a focussing cathode 219, which may be of the type shown in Figs. 5 or 6–8, or any other suitable type. Cathode 219 in conjunction with the accelerating electrode formed by the outer face of re-entrant conical portion 215, projects a beam of electrons through exciting grid-less openings 221, 223 of the re-entrant portions 215, 216 of resonator 211. The electron beam is then reversed by repelling electrode structure 225, which is held at a potential just slightly above that of cathode 219 by battery 227.

Repelling electrode 225 serves to reverse the beam and reproject it through the resonator openings 223, 221. The equivalent bunching distance of a two resonator structure is approximately four times the distance from opening 223 to repelling electrode 225. The bunching distance is selected, as discussed above, so that both fundamental and harmonic oscillations are set up in resonator 211.

In accordance with the theory described with respect to Fig. 16, two tuning paddles 229, 231 are inserted into the resonant cavity 211 to tune to the fundamental and harmonic frequencies, respectively. As shown, cavity 211 is completely evacuated. Hence re-entrant insulating sections 233, 235 serve to maintain the vacuum, while permitting effective insertion of paddles 229, 231 into the resonant cavity.

Paddles 229, 231 are adapted to be rotated by knobs 237, 239 for tuning adjustment. Scales 241, 243 and pointers 245, 247 serve to indicate the paddle settings, and thereby the frequencies.

Energy is abstracted from resonator 211 by a coupling loop 249 and transmission line 251. A filter, comprising a tuned resonant chamber 253, is inserted in this line, coupling loops 255, 257 serving as input and output to the chamber 253. This chamber 253 is tuned to the harmonic frequency and passes only that frequency to the utilization circuit, indicated as being an antenna, the fundamental being reflected back into cavity 211. It thus forms a very high Q filter.

If fundamental frequency energy is also desired, other coupling loops such as loop 258 may be used, together with suitable frequency selective devices.

In a modified form, the device of Fig. 17 may use secondary emission to increase the available power. This feature is the invention of Russell H. Varian and is claimed in copending application Serial No. 530,287, filed April 10, 1944. In this form, reflecting plate 225 is approximately at half the cathode voltage, and is covered with a secondary-electron-emissive substance. Here, the electrons from cathode 219 strike plate 225 and generate a greater number of secondary electrons, which proceed back through the resonant cavity 211 to maintain the oscillating condition of that cavity.

Figures 17A, 21, 22:
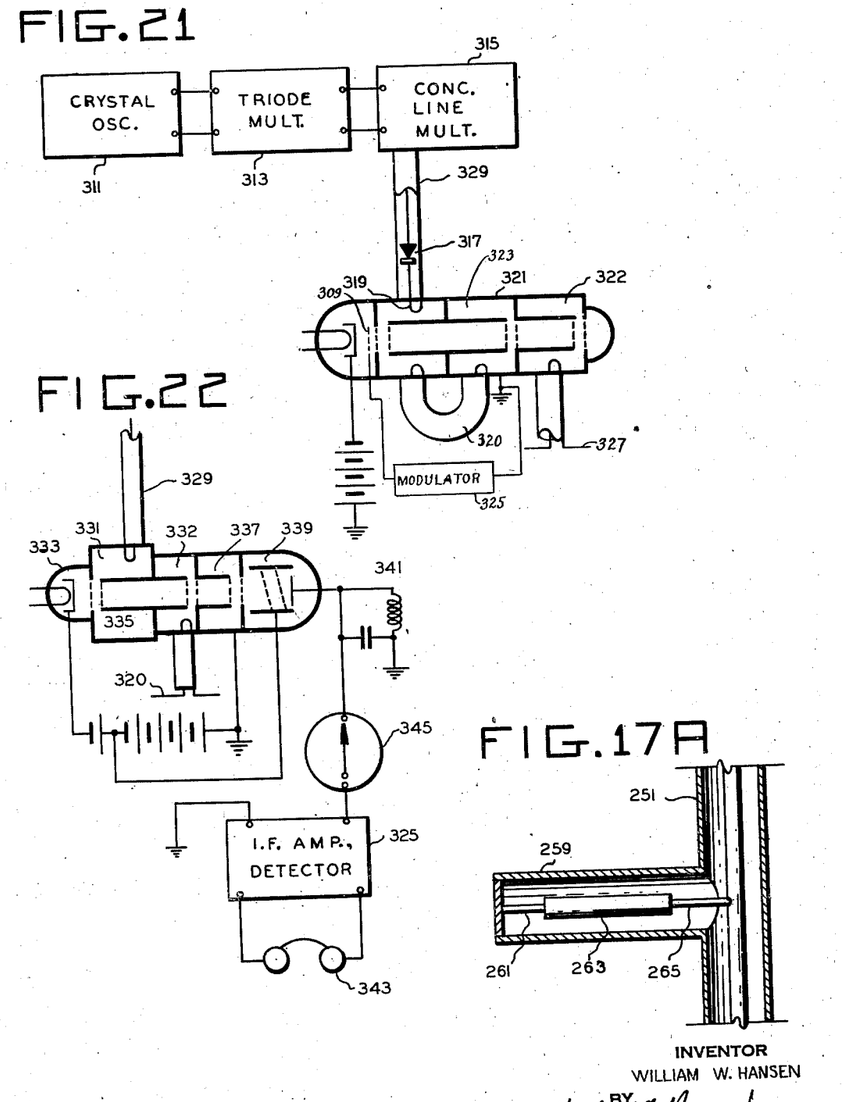
Fig. 17A shows a cross-section of a modified filter device suitable for use with the device of Fig. 17.
Fig. 21 shows a schematic representation of a radio receiver.
Fig. 22 shows a modification of the device of Fig. 21 including the frequency multiplier tube of Figs. 1, 5 or 9.

Fig. 17A shows a filter which can be used in place of the resonator 253 of Fig. 17. Here the main transmission line 251 is joined by a parallel short-circuited stub line 259. The stub line 259 is shown as having several sections 261, 263, 265 with differing diameters of central conductor.

If a 3:1 multiplication ratio is considered as an illustrative example, sections 265 and 261 are selected to be one-quarter wave long at the third harmonic frequency while section 263 is selected to be three-quarters wave long at this frequency. Hence the entire stub line 259 presents a very high shunt impedance to line 251, at the third harmonic frequency, and has little effect upon transmission of harmonic energy.

At the fundamental frequency, however, sections 261 and 265 will be one-twelfth wave long, and section 263 will be three-twelfths wave long. In adding the impedances of these sections, however, the effect of change in diameter of the central section, which causes a different characteristic impedance to exist there, must be considered. The enlarging of the central portion 263 has the effect of adding capacitance to the line. Hence the electrical length of the line will be greater than the physical length, which is $\frac{5}{12}$ wave length, and, by suitable choice of conductor dimensions may be made substantially exactly one-half wave length. Hence stub line 259 will present a short-circuit to wave energy of fundamental frequency, and prevent its transmission to the utilization device.

It is clear, of course, that similar principles may be used for any multiplication ratio, to permit passage of any desired harmonic while suppressing fundamental and other harmonic frequencies.

For high multiplication ratios, where the exciting frequency is relatively low compared to the ultimate output frequency, a tube shown schematically in Fig. 18 and structurally in Fig. 19 may be used. This device is claimed in my application Serial No. 602,007, filed June 28, 1945, as a continuation-in-part of the present application. Here the buncher resonator is replaced by a resonant system consisting of a bent section of copper tubing 271 acting as inductance and a standard variable condenser 273 as capacitance. The copper tubing 271 is directly connected at one end to the drift tube 275, which is at ground potential, and capacitively connected to the cathode 277 through insulation sleeve 279 which forms a direct current open circuit to the cathode beam driving voltage without affecting the flow of radio frequency current.

The heater and beam driving voltages are supplied through leads 281, which are brought in at the grounded end of tubing inductance 271 and travel inside the tubing to the heater and cathode. In this way, it is unnecessary to insulate these leads 231 from radio frequency voltages, since tube 271 acts as a shield.

Radio frequency energy is supplied to the resonant circuit 271–273 by means of a loop of wire 283 inductively related to inductance 271. Loop 283 may be energized from any source of radio frequency voltage to be frequency multiplied. As shown in Fig. 18, loop 283 may be connected to the radio frequency source through a preliminary concentric line frequency multiplier 285.

The radio frequency voltage applied between the cathode 277 and the accelerating electrode 287 serves to vary the beam electron velocity. The electrons accordingly are bunched in drift tube 275 and then excite catcher resonator 289 tuned to the harmonic frequency. The beam is then dissipated by collector 291, or utilized in any other suitable manner.

Resonator 289 may be tuned by any suitable means, such as screws 293, in the manner described above. The output from resonator 289 is taken from coupling member 295.

Fig. 20 shows a transmitter using any of the frequency multipliers described above. A crystal oscillator 297 supplies a stabilized radio frequency to a conventional triode multiplier 299. The output of this multiplier may be further frequency multiplied in a concentric line multiplier 301, whose output is then fed to a resonant cavity frequency multiplier 303 which may be any of the types described above. The ultra-high frequency output of this multiplier 303 may be fed to a suitable load, such as an antenna 305. The ultra-high frequency radiated may be modulated by a signal voltage from a modulation signal source 307 in multiplier 299, or in multiplier 303. In the latter case, the modulating voltage is impressed on a modulating grid 309, whereby modulation and multiplication may be effected simultaneously.

The use of modulation grid 309 presents an efficient way of keying the output micro-wave by suitable keying pulses. Thus, if the modulation signal source 307 provides keying pulses, the radiated wave will be sharply keyed wave trains at the micro-wave frequency. This method of pulsing is not confined to frequency multiplier tubes such as 303, but may be used with any electron discharge tube using electron bunching.

Fig. 21 shows a pulse transmitter using any of the frequency multipliers described above. A crystal oscillator 311 feeds a multiplier chain composed of a triode multiplier 313, a concentric line multiplier 315 and a crystal multiplier 317. Multiplier (detector) 317 may be omitted if desired. These types of multipliers are used here and in Fig. 20, each in its most effective range; that is, a triode multiplier is most efficient at ordinary radio frequencies, a concentric line multiplier at higher frequencies, and a crystal multiplier at still higher frequencies. It is clear, however, that any types of frequency multipliers may be used in place of those shown. The output of the multiplication system is fed into the "buncher" resonator 319 of a high frequency oscillator tube 321 having a "catcher" resonator 323 and a feed-back line 320 between the "catcher" and "buncher" resonators. Pulsing is effected by use of a modulator 325 controlling the voltage of a modulating grid 309. In order that the load represented by antenna 327 shall not affect the frequency of operation this antenna is supplied from a third or "buffer" resonator 322. Since this latter resonator is but unilaterally coupled to the resonators 321 and 319 by the electron beam, the load 327 is ineffectual for altering the frequency of oscillation of the system. In operation, the oscillations of the device build up rapidly due to the energy supplied from the multiplier system through line 329 to the "buncher" resonator and this energy is augmented by the feed-back 320.

Fig. 22 shows a heterodyne type receiver suitable for receiving the waves transmitted by the transmitters of Fig. 20 or Fig. 21. Here, the output of the multiplier system supplied through line 329 is fed to the buncher 331 of a frequency multiplier tube 333 of the type shown in the present application, further multiplication taking place between resonators 331 and 332. The received wave picked up on receiving antenna 320 is superposed upon the multiplied wave in resonator 332 by means of coupling 335. Both waves then pass to an amplifier stage 337 and then to a detector stage 339, which takes the place of detector 323 of Fig. 21.

The output of detector 339 may be filtered by filter 341, and the resulting intermediate frequency wave is amplified and detected in intermediate frequency amplifier and detector 325, whereupon it actuates receiver 343 or any other type of signal utilization device.

Indicator 345 may be used to line up and tune the various stages of tube 333, using the local oscillations derived from line 329 for this purpose.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A frequency multiplier apparatus comprising a source of electrons, means adjacent said source for forming said electrons into a beam, a cavity resonator tuned to a predetermined frequency for varying the velocity of electrons in said beam, a drift tube surrounding said path for permitting said electrons to bunch, a second cavity resonator along said path and tuned to a harmonic of said predetermined frequency and adapted to extract energy from said bunched beam, said resonators including means resiliently mounting the same from said drift tube, and means coupled to said resonators for simultaneously tuning said resonators and for maintaining their tuned harmonic relationship over a range of frequencies.

2. Gang tuning apparatus for an electron discharge tube having two cavity resonators tuned to different frequencies, comprising a pair of motion mechanisms, each of said motion mechanisms being adapted to be connected between different portions of a respective resonator for effecting relative motion between said portions, and a single actuating means coupled to said motion mechanisms for actuating both of said motion mechanisms simultaneously to effect gang tuning of said resonators, said motion mechanisms having different mechanical advantages whereby upon actuation of said actuating means the relative motion of the portions of one resonator would differ from that of the other to compensate for the different operating frequencies of the resonators.

3. High frequency apparatus comprising a cavity resonator tube having a plurality of cavity resonators, means for tuning each of said resonators, a cantilever tuning control member, and a plurality of thrust-transmitting members adapted to be actuated by said control member and interposed between said control member and said tuning means for simultaneously tuning said resonators upon actuation of said control member.

4. A high frequency tube structure and tuner comprising a plurality of cavity resonators, means aligned with said resonators for establishing an electron stream for passing through and exciting said resonators, each of said resonators having a gap therein adapted to contain an alternating electric field for acting upon the electron stream, gang tuning means coupled to said resonators, said gang tuning means comprising a plurality of motion transmitting systems coupled respectively to respective resonators and having differing mechanical advantages for differentially changing the field gaps of said resonators, and a single actuating means coupled to said systems for actuating said motion transmitting systems.

5. A high frequency apparatus comprising a plurality of cavity resonators, each of said resonators having relatively movable portions for adjusting the operating frequency thereof, gang tuning means coupled to said resonators comprising a plurality of motion transmitting systems having differing mechanical advantages and each coupled to a respective resonator for separately adjusting the operating frequencies of said resonators, and a single actuating means coupled to said motion-transmitting systems for actuating said motion transmitting systems.

6. A high frequency apparatus as in claim 5 wherein said actuating means comprises a cantilever member and said motion transmitting systems comprise toggle levers adapted to be actuated from said cantilever member and having different respective lengths.

7. A high frequency apparatus as in claim 5 wherein said actuating means comprises a cantilever member and said motion transmitting systems comprise thrust members adapted to be operated by said cantilever member, the thrust members corresponding to respective resonators having respectively different distances from the point of support of said cantilever member.

8. Frequency multiplier apparatus comprising a cavity resonator having a pair of substantially parallel planar electron-permeable electrodes, a pair of coaxial overlapping tubular conductive members connected respectively to said electrodes and having their common axis substantially perpendicular to said electrodes, and conductive means surrounding and connected to said electrodes and members and forming a cavity resonator therewith, said means including a flexible wall permitting relative adjustment of said electrodes to tune said resonator, said apparatus further including means aligned with said resonator for producing and projecting an electron stream through said resonator by way of said permeable electrodes, and a second resonator along the path of said stream beyond the path of said first resonator and tuned to a harmonic of the resonant frequency of said first resonator.

WILLIAM W. HANSEN.

REFERENCES CITED

The following references are of record in the file of this patent:

UNITED STATES PATENTS

| Number | Name | Date |
| --- | --- | --- |
| 2,239,905 | Trevor | Apr. 29, 1941 |
| 2,217,447 | Mouromtseff | Oct. 8, 1940 |
| 2,222,899 | Fraenckel | Nov. 26, 1940 |
| 2,227,017 | Schlesinger | Dec. 31, 1940 |
| 2,227,372 | Webster | Dec. 31, 1940 |
| 2,259,690 | Hansen | Oct. 21, 1941 |
| 2,285,662 | Hutcheson | June 9, 1942 |
| 2,309,966 | Litton | Feb. 2, 1943 |
| 2,305,884 | Litton | Dec. 22, 1942 |
| 2,107,520 | Schade | Feb. 8, 1938 |
| 2,190,515 | Hahn | Feb. 13, 1940 |
| 2,276,320 | Linder | Mar. 17, 1942 |
| 2,314,794 | Linder | Mar. 23, 1943 |
| 2,272,211 | Kohler | Feb. 10, 1942 |
| 2,280,824 | Hansen | Apr. 28, 1942 |
| 2,305,883 | Litton | Dec. 22, 1942 |
| 2,242,275 | Varian | May 20, 1941 |
| 2,263,184 | Mouromtseff | Nov. 18, 1941 |
| 2,304,186 | Litton | Dec. 8, 1942 |
| 2,311,658 | Hansen | Feb. 23, 1943 |
| 2,281,935 | Hansen | May 5, 1942 |
| 2,345,642 | Varian, et al. | Apr. 4, 1944 |

Certificate of Correction

Patent No. 2,425,738. August 19, 1947.

WILLIAM W. HANSEN

It is hereby certified that errors appear in the printed specification of the above numbered patent requiring correction as follows: Column 4, line 71, for "Hensen" read *Hansen*; column 5, line 52, for "eletctron" read *electron*; and that the said Letters Patent should be read with these corrections therein that the same may conform to the record of the case in the Patent Office.

Signed and sealed this 9th day of March, A. D. 1948.

[SEAL]

THOMAS F. MURPHY,
*Assistant Commissioner of Patents.*